(12) United States Patent
Stumpf et al.

(10) Patent No.: US 11,176,703 B1
(45) Date of Patent: Nov. 16, 2021

(54) ASSESSING VISIBILITY OF A TARGET OBJECT WITH AUTONOMOUS VEHICLE FLEET

(71) Applicant: GM Cruise Holdings LLC, San Francisco, CA (US)

(72) Inventors: Katherine Mary Stumpf, San Francisco, CA (US); Andrew David Acosta, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 64 days.

(21) Appl. No.: 16/872,497

(22) Filed: May 12, 2020

(51) Int. Cl.
*G06T 7/80* (2017.01)
*G06T 7/73* (2017.01)
*H04W 4/44* (2018.01)
*G06T 7/90* (2017.01)
*G01S 17/931* (2020.01)
*G01C 21/30* (2006.01)

(52) U.S. Cl.
CPC ............... *G06T 7/74* (2017.01); *G01C 21/30* (2013.01); *G01S 17/931* (2020.01); *G06T 7/90* (2017.01); *H04W 4/44* (2018.02); *G06T 2207/10016* (2013.01); *G06T 2207/10028* (2013.01)

(58) Field of Classification Search
CPC G06T 7/80; G06T 7/50; G06T 7/0075; G06T 7/0081; G06T 7/75; G06K 9/6292; G06K 9/00637; G06K 9/00798; H04N 13/0022; G06N 3/082; G06F 3/0487; G06F 3/04842; G06F 16/29; G01C 21/32
See application file for complete search history.

(56) References Cited

U.S. PATENT DOCUMENTS

2016/0379354 A1* 12/2016 Kim ..................... H04N 13/239
382/106
2021/0247199 A1* 8/2021 Johnson ............. G01C 21/3602

* cited by examiner

*Primary Examiner* — Phuoc H Doan
(74) *Attorney, Agent, or Firm* — Patent Capital Group

(57) ABSTRACT

A system uses a fleet of AVs to assess visibility of target objects. Each AV has a camera for capturing images of target objects. AVs provide the captured images, or visibility data derived from the captured images, to a remote system, which aggregates visibility data describing images captured across the fleet of AVs. The AVs also provide condition data describing conditions under which the images were captured, and the remote system aggregates the condition data. The remote system processes the aggregated visibility data and condition data to determine conditions under which a target object does not meet a visibility threshold.

20 Claims, 5 Drawing Sheets

ASSESSING VISIBILITY OF A TARGET OBJECT WITH AUTONOMOUS VEHICLE FLEET

TECHNICAL FIELD OF THE DISCLOSURE

The present disclosure relates generally to autonomous vehicle fleets and, more specifically, to methods and systems for assessing visibility of target objects using autonomous vehicle sensors.

BACKGROUND

When placing objects along roadways so that they can be viewed by travelers, it can be challenging to account for changing conditions that affect the visibility of objects. For example, a sign may be placed in a location that is visible from the roadway in the winter, but by summer, the sign has been covered by foliage. Certain conditions affecting visibility are not foreseeable; for example, scaffolding may go up and block the view of a sign after the sign has been placed. At present, people must personally inspect placed signage to ensure continued visibility. Frequent inspection is inefficient, and infrequent inspection can lead to extended periods of time in which signage or other objects are not visible to travelers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
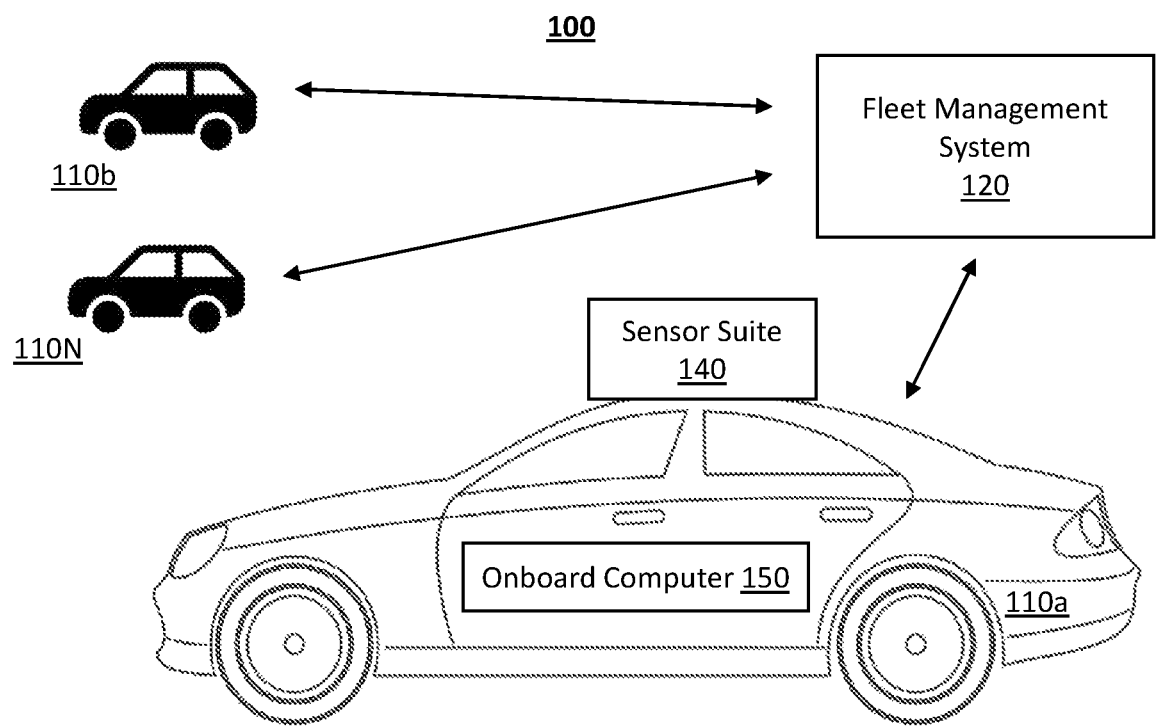
FIG. 1 is a block diagram illustrating a system including a fleet of example autonomous vehicles (AVs) for performing visibility assessment of target objects according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Many objects along a roadway are designed to be visible to people traveling along the roadway. Certain objects, such as stop signs and parking rule designations, have standard positions and designs. Other objects, including other standardized traffic signs (e.g., speed limit signs, or highway exit markers) have standardized designs, but their position is discretionary. Still other signs, such as commercial advertisements or certain municipal road signage, have discretionary placement and design. Roadway signage is designed to be highly visible to drivers and passengers as they pass the signage in a car, possibly at a high speed. However, various conditions can impede the visibility of signage in ways that may not have been anticipated when a sign was designed or placed. For example, a sign that is visible in one season may be much less visible in another season, e.g., due to changing daylight hours, changing foliage near or in front of the sign, or pollen dirtying the sign during springtime. New structures, such as buildings or scaffolding, may block view of the sign.

A fleet of autonomous vehicles (AVs) is used to continually assess the visibility of target objects. As used herein, a target object may include a road sign (e.g., a directional sign, a warning sign, an informative sign, etc.), an advertisement (e.g., a freestanding billboard, a sign on a side of a building, an advertisement at a bus station), a sign or banner indicating the location of a business or other public building, a roadside sculpture, or another object along the road intended to be viewed by travelers along the road.

In some embodiments, a fleet of AVs is configured to assess the visibility of one or more target objects. An AV may maintain a database of expected locations of target objects, compare its current location or planned route to the expected locations, and determine if it is passing or about to pass the expected location of a target object. When the AV passes an expected location of a target object, the AV captures one or more images of the expected location, which are used to determine if the target object is visible. An onboard computer of the AV or a remote server compares each captured image to an expected image of the target object to determine if the target object is visible, and if so, determines at least one measurement of the visibility of the target object. For example, the onboard computer or remote server may determine a color contrast between different parts of the target object (e.g., color contrast between a text color and a background color), a color contrast between one or more parts of the target object and its surroundings, an amount of the target object that is visible (e.g., a percentage obstructed by another object, such as a tree or scaffolding), or an amount of text on the target object that is visible.

A remote server aggregates visibility data, such as color contrast data and visibility percentages, from multiple AVs in the fleet. For example, during a one-week period, various AVs of the fleet may make a hundred trips that pass by a given target object. The remote server aggregates visibility data for each trip along with condition data describing conditions under which the visibility data was obtained. For example, condition data includes the date, time, location of the AV, weather conditions, and speed at which an AV drove past the target object and captured an image. The remote server assesses visibility of the target object based on the visibility data and condition data. For example, the remote server determines that a target object is highly visible during the daytime, but has low visibility (e.g., low observed color contrast) at nighttime. The AV fleet can continue to obtain visibility data over a long period of time, such as months or years. This enables the remote server to identify changes in visibility that are seasonal, such as changes due to foliage or reduced daylight hours, or changes in visibility that result from other changes in the environment, such as new buildings or plant growth.

Using an AV fleet enables the remote server to efficiently assess the visibility of a large number of target objects. In some embodiments, the target objects are passed by AVs on their usual routes, e.g., while the AVs are providing ride sharing or delivery services. This enables the AVs to collect data without making special trips that consume energy and other resources. Further, the AV fleet can capture visibility data under a wide variety of conditions, allowing the remote server to identify visibility patterns tied to particular conditions. The AV fleet routinely monitors target objects, allowing the remote server to quickly identify when the target object has reduced visibility, e.g., due to newly installed scaffolding or a recently downed tree.

Embodiments of the present disclosure provide a system for assessing visibility of a target object that includes a plurality of AVs. Each AV includes a camera, a memory, a processor, and communications circuitry. The memory is configured to store an image of a target object and an expected location of the target object. The processor is configured to compare a current location of the AV to the expected location of the target object to determine that the AV is traveling past the expected location; in response, retrieve an image, captured by the camera, of a field of view comprising the expected location of the target object; and compare the captured image to the image of the target object to determine a visibility of the target object. The communications circuitry is configured to provide, to a remote system, visibility data describing the visibility of the target object and condition data describing at least one condition under which the image of the field of view was captured. The remote system is configured to aggregate the visibility data and the condition data received from the plurality of AVs and, based on the aggregated visibility data, determine at least one condition under which the target object does not meet a threshold visibility level.

Embodiments of the present disclosure provide a fleet management system comprising a vehicle manager, a database, and a visibility engine. The vehicle manager is configured to instruct each of a plurality of autonomous vehicles (AVs) of an AV fleet to autonomously drive past a location of a target object, each of the plurality of AVs comprising a mounted camera; and instruct each of the plurality of AVs to capture, with the camera, an image of a field of view comprising the location of the target object, and provide visibility data describing visibility of the target object in the image captured by the camera to the fleet management system. The database is configured to store, for each of the plurality of AVs, the visibility data provided by the AV and associated condition data describing at least one condition under which each of the plurality of AVs captured its respective image. The visibility engine is configured to determine, based on the stored visibility data and associated condition data, at least one condition under which the target object does not meet a threshold level of visibility.

Embodiments of the present disclosure provide a method for assessing visibility of a target object, the method including instructing each of a plurality of autonomous vehicles (AVs) of an AV fleet to autonomously drive past a location of a target object, each of the plurality of AVs comprising a mounted camera; instructing each of the plurality of AVs to capture, with the camera, at least one image of a field of view comprising the location of the target object; receiving, from each of the plurality of AVs, data describing visibility of the target object in the at least one imaged captured by the camera; aggregating visibility data describing, for each of the plurality of AVs, visibility of the target object to the camera, and associated condition data describing, for each of the plurality of AVs, at least one condition under which the AV drove past the target object; and determining, based on the aggregated visibility data and condition data, at least one condition under which the target object does not meet a threshold visibility level.

As will be appreciated by one skilled in the art, aspects of the present disclosure, in particular aspects of assessing visibility of target objects using an AV fleet, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example System for Visibility Assessment of Target Objects

FIG. 1 is a block diagram illustrating a system including a fleet of example autonomous vehicles (AVs) for performing visibility assessment of target objects according to some embodiments of the present disclosure. The system 100 includes a fleet of AVs 110, including AV 110a, AV 110b, and AV 110N, and a fleet management system 120. For example, a fleet of AVs may include a number N of AVs, e.g., AV 110a through AV 110N. AV 110a includes a sensor suite 140 and an onboard computer 150. AVs 110b through 110N also include the sensor suite 140 and onboard computer 150. A single AV in the fleet is referred to herein as AV 110, and the fleet of AVs is referred to collectively as AVs 110. The fleet management system 120 receives service requests for the AVs 110 and dispatches the AVs 110 to carry out the service requests. When an AV 110 is dispatched for a service request, the fleet management system 120 and/or the AV 110 may identify one or more target objects along the route, and the AV 110 captures one or more images including the target object(s). The fleet management system 120 receives visibility data from the AVs 110 and determines visibility for the target objects under various different conditions.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110. For example, the sensor suite 140 includes multiple cameras mounted at different positions on the AV 110.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. In addition, the onboard computer 150 can instruct sensors of the sensor suite 140 to capture particular images and/or other sensor data. For example, the onboard computer 150 instructs a particular camera of the sensor suite 140 to capture an image of a target object.

The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. The onboard computer 150 is described further in relation to FIG. 4.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task, and instruct the selected AV (e.g., AV 110a) to autonomously drive to a particular location (e.g., a delivery address). The fleet management system 120 may select a route for the AV 110 to follow. The fleet management system 120 also manages fleet maintenance tasks, such as charging and servicing of the AVs 110.

As shown in FIG. 1, each of the AVs 110 communicates with the fleet management system 120. The AVs 110 and fleet management system 120 may connect over a public network, such as the Internet. The fleet management system 120 is described further in relation to FIG. 4.

Example AV and Target Object

Figure 2:
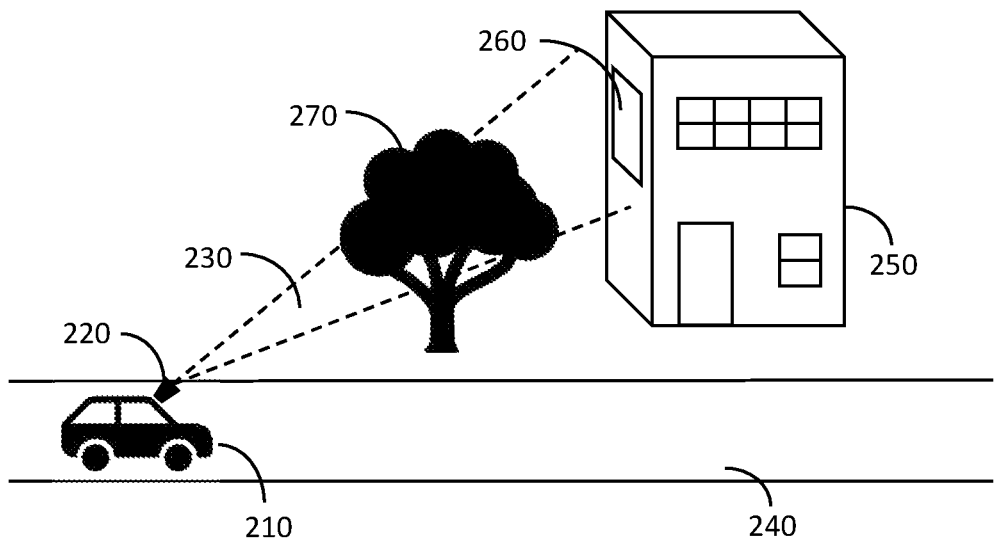
FIG. 2 illustrates an example AV assessing visibility of a target object according to some embodiments of the present disclosure.

FIG. 2 illustrates an example AV assessing visibility of a target object according to some embodiments of the present disclosure. FIG. 2 shows an AV 210 traveling down a road 240. The AV 210 is an example of the AV 110 described with respect to FIG. 1. The AV 210 includes a sensor suite similar to sensor suite 140; the sensor suite includes a camera 220 for capturing images. The camera 220 has a field of view 230. In this example, a building 250 is located along the side of the road 240. The AV 210 stores data describing the building 250, such as the width, height, and depth of the building, and data describing the location of the building. The AV 210 also stores data describing a target object 260, which in this example, is a sign on a side of the building 250. For example, the target object 260 may be a billboard, a mural, or another type of sign or image. The AV 210 stores the location of the target object 260, e.g., data describing the position of the target object along the side of the building 250. The AV 210 may also store an expected image of the target object 260.

The AV 210 determines that it is passing the target object 260 along the road 240, and the camera 220 captures an image of the field of view 230 when the field of view includes the expected location of the target object 260. In this example, a tree 270 is located between the AV 210 and the building 250, obstructing the view of the target object 260 by the camera 220. The camera 220 captures an image that includes the tree 270 and possibly some portion of the target object 260. In some embodiments, the AV 210 retrieves the captured image of the expected location of the target object and compares the captured image to a stored image of the target object 260 and determines the visibility of the target object 260. For example, the AV 210 determines a percentage of the target object 260 that is visible, e.g., is not obscured by the tree 270. The AV 210 provides data describing the visibility of the target object 260 to the fleet management system 120. In some embodiments, the AV 210 alternatively or additionally provides the captured image to the fleet management system 120. The AV 210 also provides condition data describing one or more conditions under which the camera 220 captured the image, such as the date and time, the location of the AV 210, weather information, etc. Each time the AV 210 or another AV in the fleet passes the target object 260, the AV performs a similar process of capturing an image and providing visibility and condition data to the fleet management system 120.

Example Sensor Suite

Figure 3:
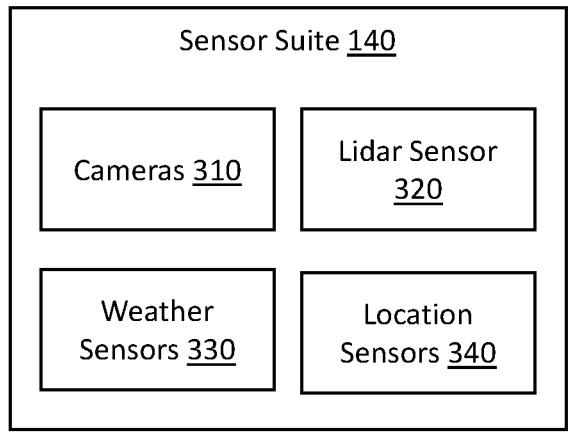
FIG. 3 illustrates an example AV sensor suite according to some embodiments of the present disclosure.

FIG. 3 illustrates an example AV sensor suite according to some embodiments of the present disclosure. The sensor suite 140 includes one or more cameras 310, a lidar sensor 320, one or more weather sensors 330, and a location sensor 340. The sensor suite 140 may have more sensors than those shown in FIG. 3, such as the sensors described with respect to FIG. 1. In other embodiments, the sensor suite 140 may not include one or more sensors shown in FIG. 1. For example, the sensor suite 140 may have a radar sensor instead of (or in addition to) the lidar sensor 320.

The cameras 310 capture images of the environment around the AV 110. The sensor suite 140 may include multiple cameras 310 to capture different views, e.g., a front-facing camera, a back-facing camera, and side-facing cameras. One or more cameras 310 may be implemented using a high-resolution imager with a fixed mounting and field of view. One or more cameras 310 may have adjustable field of views and/or adjustable zooms. In some embodiments, the cameras 310 capture images continually during operation of the AV 110. The cameras 310 transmit the captured images to a perception module of the AV 110. In addition, the AV 110 (e.g., the camera 310 or perception module) may route select images to a processor or processing module for determining visibility of target objects, such as target object processing module 460 described with respect to FIG. 4.

The lidar (light detecting and ranging) sensor 320 measures distances to objects in the vicinity of the AV 110 using reflected laser light. The lidar sensor 320 may be a scanning lidar that provides a point-cloud of the region scanned. The lidar sensor 320 may have a fixed field of view or a dynamically configurable field of view. The lidar sensor 320 may produce a point cloud that describes, among other things, a distance to a target object and a distance to any objects that obstruct the view from the AV 110 to the target object.

The weather sensors 330 are sensors configured to measure one or more weather conditions. For example, weather sensors 330 include a temperature sensor, an ambient light sensor, a precipitation sensor, and a barometric pressure sensor. The weather sensors 330 may gather weather data for various purposes, e.g., to determine whether to turn on windshield wipers, and to determine whether to turn on headlights. In addition, the weather sensors 330 gather data that relates to visibility conditions around the AV 110, such as the ambient light level in the environment of the AV 110, and the amount and type of precipitation in the environment of the AV 110.

The location sensors 340 collect data that is used to determine a current location of the AV 110. The location sensors 340 may include a GPS sensor and one or more IMUs. The location sensors 340 may further include a processing unit (e.g., a module of the onboard computer 150, or a separate processing unit) that receives signals (e.g., GPS data and IMU data) to determine the current location of the AV 110. The location determined by the location sensors 340 is used for route and maneuver planning. The location may also be used to determine when to capture images of the target object. The location may also be reported as a condition for the visibility data, i.e., the precise location that the images were captured from.

Example Onboard Computer

Figure 4:
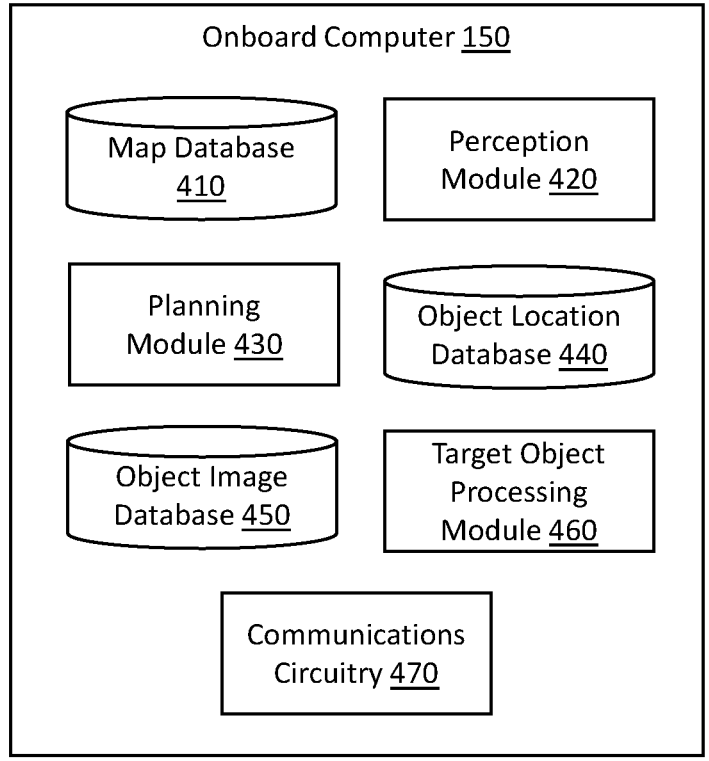
FIG. 4 is a block diagram illustrating an onboard computer according to some embodiments of the present disclosure.

FIG. 4 is a block diagram illustrating the onboard computer 150 according to some embodiments of the present disclosure. The onboard computer 150 includes a map database 410, a perception module 420, a planning module 430, an object location database 440, an object image database 450, a target object processing module 460, and communications circuitry 470. In alternative configurations, fewer, different and/or additional components may be included in the onboard computer 150. For example, components and modules for controlling movements of the AV 110 and other vehicle functions are not shown in FIG. 4. Further, functionality attributed to one component of the onboard computer 150 may be accomplished by a different component included in the onboard computer 150 or a different system from those illustrated.

The map database 410 stores a detailed map that includes a current environment of the AV 110. The map database 410 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type). The map database 410 may further include data describing other features, such as bike lanes, sidewalks, crosswalks, traffic lights, parking lots, etc.

The perception module 420 identifies objects in the environment of the AV 110. The sensor suite 140 produces a data set that is processed by the perception module 420 to detect other cars, pedestrians, trees, bicycles, and objects traveling on or near the road on which the AV 110 is traveling, and indications surrounding the AV 110 (such as construction signs, traffic cones, traffic lights, stop indicators, and other street signs). For example, the data set from the sensor suite 140 may include images obtained by cameras, point clouds obtained by lidar (light detecting and ranging) sensors, and data collected by radar sensors. The perception module 420 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a pedestrian classifier recognizes pedestrians in the environment of the AV 110, a vehicle classifier recognizes vehicles in the environment of the AV 110, etc. The perception module 420 may also perform predictive analysis on some recognized objects, e.g., to determine projected pathways of other vehicles, bicycles, and pedestrians.

The planning module 430 plans maneuvers for the AV 110 based on map data retrieved from the map database 410, data received from the perception module 420, and navigation information, e.g., a route instructed by the fleet management system 120. In some embodiments, the planning module 430 receives map data from the map database 410 describing known, relatively fixed features and objects in the environment of the AV 110. For example, the map data includes data describing roads as well as buildings, bus stations, trees, fences, sidewalks, etc. The planning module 430 receives data from the perception module 420 describing at least some of the features described by the map data in the environment of the AV 110. This planning module 430 may compare map data with data from the perception module 420 to confirm the accuracy of the map data and to determine the precise positions of perceived objects on the map.

The planning module 430 determines a pathway for the AV 110 to follow. When the perception module 420 detects moving objects in the environment of the AV 110, the planning module 430 determines the pathway for the AV 110 based on predicted behaviors of the objects and right-of-way rules that regulate behavior of vehicles, cyclists, pedestrians, or other objects. The pathway includes locations for the AV 110 to maneuver to, and timing and/or speed of the AV 110 in maneuvering to the locations. An AV controller (not shown in FIG. 4) instructs the movement-related subsystems of the AV 110 to maneuver according to the pathway determined by the planning module 430.

The object location database 440 stores data describing expected locations of target objects. The object location database 440 may include data for the selected set of target objects provided by the fleet management system 120 to the AV 110. For example, the object location database 440 stores data describing the locations of target objects along a route the AV 110 is instructed by the fleet management system 120 to drive, or target objects within a city serviced by the AV 110. The object location database 440 may include, for each target object, geographic coordinates of the target object (e.g., longitude and latitude), an altitude (e.g., distance from ground), and size data (e.g., height and width). The object location database 440 may include data for identifying a position in the map database 410 of the target object, e.g., data identifying a wall of a building in the map database 410 that a target object is placed on. The fleet management system 120 may transfer the expected location data over a wireless or wired connection, or an operator may load a physical storage medium (e.g., a hard drive) with the data onto the AV 110. The object location database 440 may be periodically updated by the fleet management system 120, e.g., when new objects are added to the target object data maintained by the fleet management system 120, or when the AV 110 travels along a different route or to a different region.

The object image database 450 stores images of the target objects described by the target location database. The object image database 450 may store one image for each target object, e.g., an image of a sign provided by the entity that placed the sign. In some embodiments, a single image may be associated with multiple target objects at different locations, e.g., if an advertiser places the image on several billboards. In some embodiments, the object image database 450 stores one or more images of the target object in its environment. For example, the object image database 450 stores multiple images captured under different lighting conditions, during different seasons, or from different angles. The images may have been captured by the AVs 110. In some embodiments, the object images are stored together with the object locations in a single target object database. The fleet management system 120 may transfer the object images over a wireless or wired connection, or an operator may load a physical storage medium (e.g., a hard drive) with the object images onto the AV 110.

The target object processing module 460 determines to capture an image of a target object and processes the captured image. For example, the target object processing module 460 determines that it is traveling past an expected location of a target object by comparing the current location of the AV 110 (e.g., as provided by the location sensors 340) to the locations of target objects in the object location database 440. The target object processing module 460 may identify target objects along a planned route, or portion of a planned route, for the AV 110 prior to driving the route or a portion of the route by comparing the route or route portion to the locations of the objects in the object location database 440 and identifying, based on the comparison, a set of objects that the AV 110 plans to travel past.

In response to determining that the AV is traveling past the expected location, the target object processing module 460 retrieves an image captured by one of the cameras 310 of a field of view that includes the expected location of the target object. In some embodiments, the target object processing module 460 identifies a particular camera that includes the target object in its field of view (e.g., a camera directed towards the right side of the AV 110 if the target object is along the right side of the roadway) and requests an image or series of images from that camera, or from the perception module 420. In some embodiments, the target object processing module 460 instructs a camera to capture an image of the expected location and transmit the captured image to the target object processing module 460.

The target object processing module 460 compares the captured image to the image of the target object to determine a visibility of the target object. In some embodiments, the target object processing module 460 determines if the target object is present within the image and, if so, determines the location of the target object within the image. For example, the target object processing module 460 uses edge detection to detect the boundaries of the target object or a potential target object within the captured image. The target object processing module 460 compares the image within the boundaries to the stored image of the target object to determine if the target object is within the identified boundaries. As another example, the target object processing module 460 performs divide-and-conquer search algorithm to search for the target object within the captured image, and identifies the boundaries of the target object. The target object processing module 460 may use other object recognition techniques, such as grayscale matching, gradient matching, or feature-based matching, or a combination of object recognition techniques. As discussed above, the object image database 450 may store multiple example images of the target object, e.g., images captured under different lighting conditions, during different seasons, or from different angles. Comparing the captured image to multiple example images of the target object may improve the ability of the target object processing module 460 to identify a target object within the captured image.

After finding the target object within the captured image, the target object processing module 460 further processes the image to determine the visibility of the target object within the image. In one embodiment, the target object processing module 460 determines visibility of the target object by measuring color contrast in the image. Visibility of a target object is greater when multiple colors within the object have greater contrast relative to each other, e.g., when text on a sign strongly contrasts with the background of the sign. In addition, visibility of a target object is enhanced when colors within the object have greater contrast relative to other colors near the target object, e.g., when a sign contrasts with surrounding foliage or a building behind the sign.

In one example, the target object processing module 460 identifies boundaries of the target object in the captured image, as described above, and determines a color contrast between the target object and an area outside the boundaries of the target object. The target object processing module 460 may select, as a color describing the target object, a color near a boundary of the target object (e.g., a border color or background color of a sign), the color that takes up the largest area of the target object (e.g., the color present in the greatest number of pixels identified as being within the boundaries of the target object), or an average color of the target object. The target object processing module 460 may select, as a color describing the area outside the target object, a most common color in a region near the boundary or an average color of an area outside the boundary. In some embodiments, the target object processing module 460 calculates multiple color contrast values, e.g., color contrasts describing each of four boundaries (left, right, top, and bottom) of a sign.

In another example, the target object processing module 460 identifies boundaries of the target object in the captured image, as described above, and determines a color contrast between different parts within the target object. For example, the target object processing module 460 identifies texts or logos within the image of the target object, and for each unique text or logo color, calculates a color contrast with respect to the background of the text or logo.

In another example, the target object processing module 460 identifies boundaries of the target object in the captured image, as described above, and determines an obstruction level of the target object. For example, the target object processing module 460 compares the stored image of the target object to the captured image of the target object and determines an area of the target object in the captured image that matches the stored image, e.g., a percentage of the captured image that matches the stored image. The target object processing module 460 may adjust the captured image and/or the target object so that the captured image and target object are the same size. For example, the target object processing module 460 resizes the captured image, rotates the captured image, and/or adjusts the perspective of the captured image. The target object processing module 460 then compares the captured image to the stored image pixel-by-pixel to determine if each pair of corresponding pixels match, e.g., if the pixel colors are within a threshold color distance from each other. The pixels that do not match may be caused by an obstructing object, and the obstruction level describes the amount of the target object that is obstructed from the AV camera by the obstructing object.

In some embodiments, in response to determining that a target object is at least partially obstructed, the target object processing module 460 identifies the location and type of the obstructing object. For example, as discussed above, the perception module 420 may include one or more classifiers trained using machine learning to identify particular objects. The perception module 420 may use one or more classifiers trained to classify a particular object in the environment of the AV 110 as one of a set of potential objects, e.g., a vehicle, a truck, a pedestrian, a tree, scaffolding, another building, etc. The classifier or classifiers may rely on data from the lidar sensor 320, which provides a point cloud describing the physical shapes of three dimensional objects. In some embodiments, the classifier or classifiers rely on data from a combination of sensors, e.g., cameras 310, the lidar sensor 320, and/or radar sensors. The target object processing module 460 may request, from the perception module 420, the object type for an obstructing object that was determined by the classifier or classifiers. In addition to determining the object type, the perception module 420 may determine the location of the obstructing object and/or size of the obstructing object and provide this information to the target object processing module 460.

In an embodiment, the target object processing module 460 determines an obstruction level for the passenger compartment of the AV 110, e.g., for the viewpoint of a particular passenger or set of passengers of the AV. For example, if the camera 310 is on top of the AV 110, and an average-height passenger's eyes are located 2 feet below the camera 310, an obstructing object that obstructs a top portion of a bus station sign in the field of view of the camera 310 may not obstruct the bus station sign from the viewpoint of the passenger. To analyze the obstruction from the point of view of the passenger, the target object processing module 460 determines the locations of the target object and of the obstructing object relative to the AV 110. For example, the target object processing module 460 receives, from the perception module 420, a distance to the target object and a distance to the obstructing object determined based on the point cloud from the lidar sensor 320. The perception module 420 may also determine and provide data describing the size of the target object and the size of the obstructing object, or the target object processing module 460 may receive the target object size from the object location database 440. The target object processing module 460 models the relative locations of the passenger, the obstructing object, and target object based on the received location and size data, and determines, based on the relative locations of the target object and obstructing object and the sizes of the target object and the obstructing object, an obstruction level of the target object from the viewpoint of the passenger.

In some embodiments, the target object processing module 460 receives multiple images of the target object captured at different times, as the AV 110 travels down the roadway past the target object. The target object processing module 460 may separately analyze each image according to the processes described above to determine, at different locations along the roadway, the visibility of the target object. In addition, the target object processing module 460 may determine a duration of time and/or a portion of the roadway from which the target object is visible. For example, the target object processing module 460 determines a start time and/or start location at which the target object becomes visible based on the distance to the target object, the size of the target object, and the relative position of the target object (e.g., whether a sign is viewed straight-on or at an angle). The cameras 310 and other sensors of the AV 110 may have greater perception than an average human (e.g., a computer vision system may detect text that a person with 20/20 vision cannot see), so the target object processing module 460 can be programmed to determine if a target object is visible to a human, e.g., if text on a target object is readable to a human, rather than to the AV 110. The target object processing module 460 also determines a stop time and/or location at which the target object is no longer visible, and determines whether the target object is visible at points between the start time and end time (or a range between the start location and end location), or if the target object is not visible for some period or portion of the range.

The target object processing module 460 also captures condition data describing conditions under which the AV 110 observed the target object. For example, condition data includes the date and time that the camera 310 captured the image or images. The condition data may further include the location of the AV 110 when each image was captured. The condition data may include weather condition information, as collected by the weather sensors 330. For example, the weather sensors 330 include an ambient light sensor, and the condition data includes an ambient light level measured by the ambient light sensor. The condition data may include the speed at which the AV 110 was driving when it captured the image. The condition data may include any other data available to the AV 110 and relevant to a passenger's ability to perceive a target object.

The communications circuitry 470 communicates with the fleet management system 120. In particular, the communications circuitry 470 provides, to the fleet management system 120, the visibility data and condition data determined by the target object processing module 460. The communications circuitry 470 also receives data and instructions from the fleet management system 120, such as the target object data stored in the object location database 440 and the target object images stored in the object image database 450.

In some embodiments, the communications circuitry 470 transmits the visibility data and condition data wirelessly, e.g., over a cellular network while the AV 110 is traveling, or over a local area network (e.g., a WiFi or Bluetooth connection) while the AV 110 is at an AV facility for charging, storage, or maintenance. In some embodiments, the communications circuitry 470 transmits the visibility data and condition data over a wired connection while the AV 110 is at an AV facility. In still other embodiments, the communications circuitry 470 transmits the visibility data and condition data to a physical storage medium (e.g., a hard drive) that is physically removed from the AV 110 at a facility, read by another device, and transferred to the fleet management system 120.

Example Fleet Management System

Figure 5:
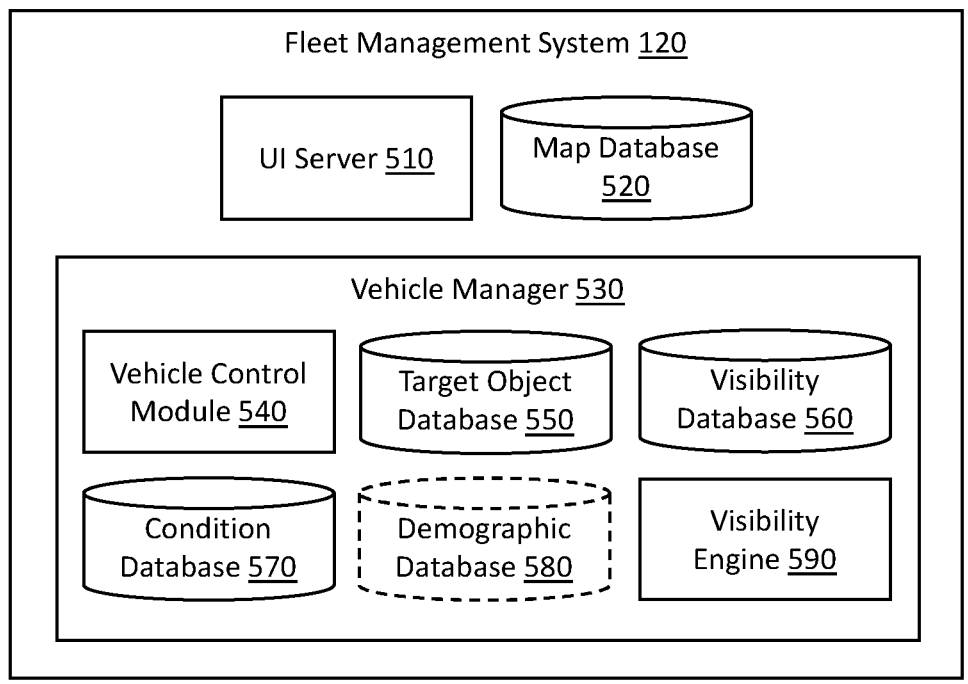
FIG. 5 is a block diagram illustrating a fleet management system according to some embodiments of the present disclosure.

FIG. 5 is a block diagram illustrating the fleet management system 120 according to some embodiments of the present disclosure. The fleet management system 120 includes a UI (user interface) server 510, a map database 520, and a vehicle manager 530 that includes a vehicle control module 540, a target object database 550, visibility database 560, condition database 570, user database 580, and a visibility engine 590. In alternative configurations, different, additional, or fewer components may be included in the fleet management system 120. Further, functionality attributed to one component of the fleet management system 120 may be accomplished by a different component included in the fleet management system 120 or a different system than those illustrated. For example, one or more components shown in the vehicle manager 530 may reside outside the vehicle manager 530; e.g., the user database 580 may be maintained and stored by the UI server 510.

The UI server 510 is configured to communicate with client devices that provide a user interface to users. For example, the UI server 510 may be a web server that provides a browser-based application to client devices, or the UI server 510 may be a mobile app server that interfaces with a mobile app installed on client devices. The user interface enables the user to access a service of the fleet management system 120, e.g., to request a ride from an AV 110, or to request a delivery from an AV 110.

The map database 520 stores a detailed map describing roads and other areas (e.g., parking lots, AV service facilities) traversed by the fleet of AVs 110. The map database 520 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. A portion of the data stored in the map database 520 is provided to the AVs 110 as a map database 410, described above.

The vehicle manager 530 manages and communicates with a fleet of AVs, including AVs 110a through 110N. The vehicle manager 530 includes a vehicle control module 540, which controls the movements of the AVs 110 in the fleet, and a visibility engine 590 that assesses visibility of target objects. The vehicle manager 530 also includes various databases, including target object database 550, visibility database 560, condition database 570, and user database 580, which are used by the visibility engine 590 to assess visibility of target objects under different conditions and for different passengers.

The vehicle control module 540 directs the movements of the AVs 110 in the fleet. The vehicle control module 540 receives service requests from users from the UI server 510, and the vehicle control module 540 assigns service requests to individual AVs 110. In addition, the vehicle control module 540 may instruct AVs 110 to drive to other locations while not servicing a user, e.g., to improve geographic distribution of the fleet, to anticipate demand at particular locations, to drive to a charging station for charging, etc. In some embodiments, the vehicle control module 540 instructs an AV 110 to drive to a location to capture images of a particular target object. The vehicle control module 540 also instructs AVs 110 to return to AV facilities for recharging, maintenance, or storage. The vehicle control module 540 may include or interface with a navigation system that selects a route for an AV 110 to follow based on data in the map database 520.

The target object database 550 stores data describing target objects, including the locations of the target objects and expected images of the target objects. The target object database 550 stores the object location data described with respect to the object location database 440 and the object images described with respect to the object image database 450. In some embodiments, the vehicle manager 530 includes two separate databases for the object location data and the object image data rather than a single target object database 550. The target object database 550 may store data describing target objects along any roads and other areas traversed by the fleet of AVs 110, while the object location database 440 and object image database 450 for a given AV 110 store a subset of the information in the target object database 550 that describe target objects within a particular region or along a particular route. As described with respect to FIG. 4, the vehicle manager 530 may provide data from the target object database 550, including expected images of target objects and expected locations of target objects, to the AVs 110, and the AVs 110 determine visibility data of target objects at expected locations based on the expected images.

In an embodiment, the UI server 510 receives a service request from a user, such as a request for a ride, and the vehicle control module 540 selects an AV 110 of the fleet to carry out the service request. The vehicle control module 540 identifies an origin location (e.g., a current location of the AV 110), a destination location (e.g., a drop-off location of the user), and any waypoints (e.g., a location to pick up the user). The vehicle control module 540 determines a route for the AV 110 based on the origin location, destination location, and waypoints. The vehicle control module 540 may compare the determined route to the locations of target objects in the target object database 550 to determine if the AV 110 passes the location of a target object. The vehicle control module 540 instructs the AV 110 to drive the determined route that includes the location of a target object, and, in some embodiments, instructs the AV 110 to capture at least one image of the target object(s) along the route. In other embodiments, the AV 110 (e.g., the target object processing module 460) identifies target objects along a route or in the environment of the AV 110, as described with respect to FIG. 4. The vehicle control module 540 further instructs the AV 110 to provide visibility data describing the visibility of the target object(s) in the image(s) captured by the AV camera (e.g., cameras 310) to the fleet management system 120. The AV 110 determines and provides visibility data as described with respect to FIG. 4.

In some embodiments, the vehicle control module 540 instructs an AV 110 to drive to the location of a target object not along a route of the AV 110. For example, the vehicle control module 540 instructs an AV 110 that is not servicing user requests to drive a route that includes one or more target objects, e.g., a target object that has not been imaged recently, or a target object that has not been imaged in a current condition (e.g., at dusk, or in a rainstorm). As another example, the vehicle control module 540 identifies a target object that is near a route determined for servicing a user, and adjusts the route of the AV 110 to capture the target object. For example, the vehicle control module 540 identifies a target object that adds less than a threshold length of time (e.g., two minutes) to a route, and routes the AV 110 along the slightly longer route in order to capture the target object.

The visibility database 560 aggregates visibility data received from the fleet of AVs 110 describing the visibility of the target objects. The vehicle manager 530 receives visibility data from the fleet of AVs 110 and stores the visibility data in the visibility database 560. The visibility data may include any of the types of visibility data described with respect to FIG. 4, including data describing color contrast (e.g., contrast between different parts of the target object, or contrast between the target object and a background), obstruction level (e.g., a percentage of the target object that is obstructed by an obstructing object, data describing the obstructing object), and/or visibility duration (e.g., length of time the target object was visible, or a portion of the roadway from which the target object is visible). The visibility data may further include data identifying and/or describing any detected obstructing objects. The visibility data may alternatively or additionally include one or more captured images. In some embodiments, AVs 110 provide captured images, and the vehicle manager 530 (e.g., the visibility engine 590) is configured to calculate visibility data (e.g., color contrast, obstruction level, or visibility duration) from the captured images, using any of the processes described with respect to FIG. 4.

The condition database 570 aggregates condition data received from the fleet of AVs 110 describing conditions under which the image(s) used to assess visibility were collected. The vehicle manager 530 receives condition data from the fleet of AVs 110 and stores the condition data in the condition database 570. In some embodiments, the visibility database 560 and the condition database 570 are combined in a single database. The condition data may include any of the types of condition data described with respect to FIG. 4, including date and time at which the image was captured and weather conditions under which the image was captured. The vehicle manager 530 may also collect data from other sources and include it in the condition database 570. For example, the condition database 570 may include weather conditions data received from a third party weather data source.

As another example, the condition database 570 includes traffic flow data describing traffic flow on the roadway when the AV 110 captured the image(s). The traffic flow data may be based at least in part on data received from the AV 110 that provided the visibility data. In some embodiments, the vehicle manager 530 receives speed data from AVs 110 across the fleet, and the vehicle manager 530 aggregates this speed data to determine real-time traffic conditions. In some embodiments, the vehicle manager 530 receives traffic flow data from third party sources.

The user database 580 stores data describing passengers traveling in AVs 110 and rides taken by the passengers. The user database may store demographic data of users of the service (e.g., a rideshare service) provided by the fleet management system 120. In some embodiments, the fleet management system 120 asks users to volunteer demographic information and to allow the fleet management system 120 to correlate the demographic information with rides taken by the passengers. The demographic information can include, for example, age, gender, home address, zip code, income, profession, and hobbies or interests. The user database 580 may also include ride history data for the user. The ride history data may include, for each ride, an origin location, a destination location, date and time of the ride, and data describing the route traveled.

The visibility engine 590 is configured to process data in the visibility database 560 and the condition database 570 to determine whether a target object is visible, and conditions under which the target object is or is not visible. In a simple example, the visibility engine 590 determines that a target object is not visible from any location under any condition. For example, if a building is erected that blocks view of the target object, the visibility engine 590 may determine that, after a certain date, the visibility data received from AVs 110 indicates that the target object processing module 460 did not find the target object within the captured images. The visibility engine 590 may retrieve one or more stored images of the expected location of the target object and confirm that the target object is not visible. Furthermore, the visibility engine 590 may determine a reason that the target object is not visible, e.g., that a building is blocking the expected location of the target object. The visibility engine 590 may receive, from the AV 110, the output of the obstructing object classification performed by the onboard computer 150 (as described with respect to FIG. 4), or the visibility engine 590 may perform obstructing object classification on one or more received images using the process described with respect to FIG. 4.

In another example, for a given target object, the visibility engine 590 retrieves visibility data from the visibility database 560 and identifies a set of instances in which the target object did not meet at least a threshold level of visibility, e.g., a set of instances in which the color contrast within the target object in a captured image was below a threshold contrast level. The visibility engine 590 processes the condition data corresponding to these instances of low visibility to determine if there is a certain condition or set of conditions correlated to low visibility. For example, the visibility engine 590 determines that, between 15 minutes after sunset (determined based on weather data) until 8:00 pm, color contrast for a target object is below a threshold contrast level. This may be due to lights set up to illuminate the target object automatically turning on at 8:00 pm, which in certain times of the year is too late for the target object to be continuously visible.

In another example, for a given target object, the visibility engine 590 retrieves visibility data from the visibility database 560 that includes locations from which the target object is and is not visible from. For example, each AV 110 reports visibility data based on a captured image and a corresponding location of the AV 110 when it captured the image. As discussed above, each AV 110 may provide a range of locations from which the AV 110 determined that the target object was visible. The visibility engine 590 processes the visibility data and associated locations to determine a geographic area from which the target object is visible, e.g., a particular length of a roadway. For example, if at least a threshold number of AVs 110 (e.g., 90%) in a given time period (e.g., the past week) determine that the target object is visible from a given location, the visibility engine 590 determines that the target object is visible from this location. In some embodiments, the visibility engine 590 also checks that the target object is visible in one or more recent captured images (e.g., four of the last five image captures, including the most recent capture) from a given location in determining that the target object is visible from that location. The visibility engine 590 may output map data describing visibility regions of one or more target objects.

The visibility engine 590 can identify other trends based on correlating visibility data and condition data. For example, the visibility engine 590 may determine if a target object often becomes obstructed during periods of high traffic (e.g., because another vehicle blocks the view), if a target object has reduced visibility during wind or snow, or if a target object has reduced visibility in certain seasons or date ranges (e.g., during spring and summer due to foliage, or from April 1 through April 15 due to heavy pollen obstructing the target object). The classification of obstructing objects can be used to determine if an obstruction is expected to be permanent (e.g., a new building), semi-permanent (e.g., scaffolding or a downed tree), or temporary (e.g., a moving vehicle). The visibility engine 590 may process the collected data periodically (e.g., daily or weekly) and flag any target objects with reduced visibility, or flag changes in visibility from the prior period.

In some embodiments, the visibility engine 590 flags certain target objects that have low visibility or are not visible in captured images in real-time. The visibility engine 590 may implement some filters to ensure that it is not flagging target objects that have already been determined to have reduced visibility, or flagging temporary conditions that resolve on their own. For example, each time new visibility data is received, the visibility engine 590 determines if there is an impact to visibility (e.g., greater than 10% of the object is obstructed, or any portion of the text is obstructed). If the visibility is reduced, the visibility engine 590 determines if full visibility is expected under the current set of conditions (e.g., low traffic, normal speed), or if an expected level of visibility is met (e.g., visible but with reduced color contrast at nighttime). The visibility engine 590 may further filter certain types of obstructions, such as moving vehicles. If the visibility engine 590 determines that there is a new visibility impact, the visibility engine 590 transmits an alert to an operator, such as the owner of the target object. The alert may further include a determination of the cause of the low visibility (e.g., a recently downed tree obstructing a portion of the target object) and/or a captured image of the expected location of the target object. This can enable the operator to quickly address the visibility impact. In some embodiments, the target object is a dynamic sign, and an operator can quickly adjust the dynamic sign based on the visibility impact. For example, the operator can move the text in response to an obstruction, or adjust colors on the sign in response to a low color contrast level.

In some embodiments, the visibility engine 590 also correlates demographic data from the user database 580 with data from the visibility database 560 and condition database 570. As discussed above, the visibility engine 590 determines conditions under which a given target object is visible, and conditions under which the given target object is not visible. The visibility engine 590 may determine a frequency with which a given demographic group travels past the sign while it is expected to be visible. This can be used by an owner or manager of one or more target objects (e.g., a set of billboards) to determine which messages to place on which billboard to best reach a target audience, or to set a price for a billboard based on the types and quantities of users that pass the billboard.

Example Method for Assessing Visibility of a Target Object

Figure 6:
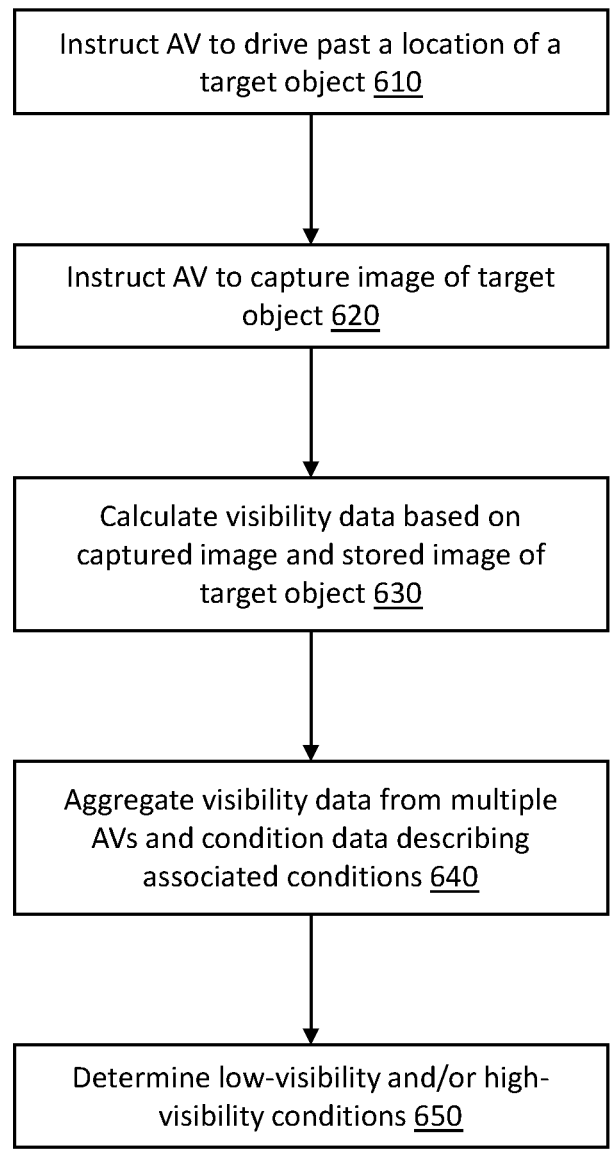
FIG. 6 illustrates a flow diagram showing a process for assessing visibility of a target object according to some embodiments of the present disclosure.

FIG. 6 illustrates a flow diagram showing a process for assessing visibility of a target object according to some embodiments of the present disclosure. The fleet management system 120 (e.g., the vehicle control module 540) instructs 610 an AV 110 to drive past a location of a target object. For example, the vehicle control module 540 instructs an AV 110 to drive a delivery route that includes a road that passes by a target object.

The fleet management system 120 (e.g., the vehicle control module 540) instructs 620 an AV to capture an image of the target object. For example, the fleet management system 120 provides the expected location of the target object to the AV 110, which captures the image of the expected location of the target object. As another example, the fleet management system 120 provides a database of target object locations to the AV 110 and instructions to reference the database and capture images of target objects when the AV 110 passes target object locations.

The fleet management system 120 receives 630 data describing visibility of the target object in the image captured by the AV 110. For example, the fleet management system 120 receives visibility data, such as color contrast data or obstruction data, calculated by the AV 110 from the captured image. In addition or alternatively, the fleet management system 120 receives the captured image, which the fleet management system 120 can analyze to determine visibility of the target object.

The fleet management system 120 aggregates 640 visibility data from multiple AVs 110 and associated condition data describing conditions under which the AVs 110 drove past the target object and captured images. The fleet management system 120 determines 650, based on the aggregated visibility data and condition data, low-visibility conditions, e.g., a condition or set of conditions under which the target object does not meet a threshold visibility level.

Example Method for Identifying a Location for a Target Object

In another embodiment, a fleet of AVs 110 identifies potential locations for new target objects. In particular, an AV 110 can determine if a side of a building is suitable for a sign or painting. As described with respect to FIG. 4, the AV 110 has a map database 410 that includes the locations and sizes of buildings. The target object processing module 460 analyzes the map data to identify potential surfaces on candidate buildings for installing a sign. If the map data includes the placement and positions of windows, doors, and other features, the AV 110 may consider only particular walls as potential surfaces, e.g., walls without windows or doors, or walls with a large area that does not include any doors or windows. Alternatively, the target object processing module 460 can receive one or more images from the camera 310 that include a potential surface and determine based on the images if a sufficiently large span without any windows or doors is present on the potential surface. The map database 410 may also include data describing a type or purpose of a building. If so, the target object processing module 460 may consider surfaces of certain types of buildings (e.g., commercial buildings) while not considering surfaces of other types of buildings (e.g., government buildings, residential buildings) as potential surfaces for target objects.

The target object processing module 460 analyzes captured images of potential surfaces to determine their visibility. The target object processing module 460 may determine the visibility of the potential surface in the same way that the target object processing module 460 determines the visibility of a target object. If the target object processing module 460 determines that a potential surface has a sufficiently large span on which to place a target object, and that the potential surface is sufficiently visible (e.g., the potential surface is not obstructed and is visible for at least a threshold duration of time), the target object processing module 460 provides, via the communications circuitry 470, data identifying the potential surface to the fleet management system 120 as a potential location for placing a target object.

The fleet management system 120 may aggregate data from multiple AVs 110 before recommending the location as a target object. For example, if a potential surface was found to be visible to five AVs but not to ten other AVs, the surface may not be a good candidate for placing the target object. The fleet management system 120 may also consider traffic data, recommending potential surfaces in high-traffic locations but not in low-traffic locations. The fleet management system 120 may further consider demographic data stored in the user database 580 and report frequencies with which different demographic profiles drive past the potential location.

Figure 7:
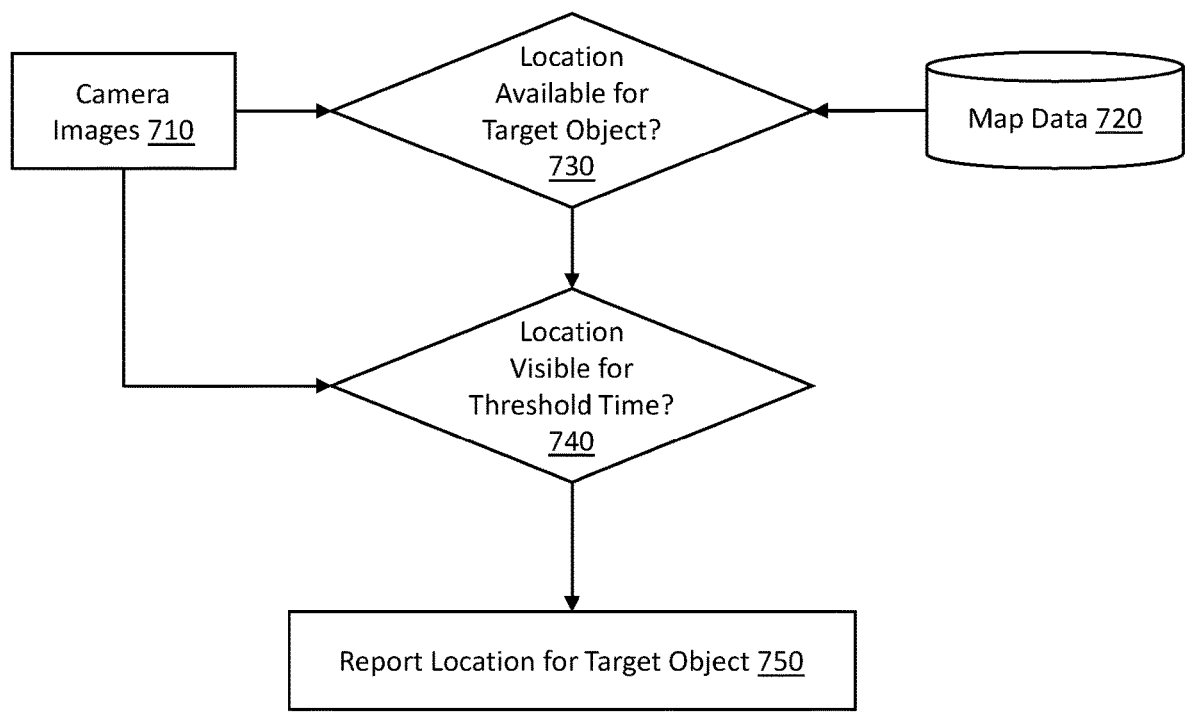
FIG. 7 illustrates a flow diagram showing a process for identifying a location to place a target object according to some embodiments of the present disclosure.

FIG. 7 illustrates a flow diagram showing an example process for identifying a location to place a target object according to some embodiments of the present disclosure. Camera images 710 (e.g., images from the cameras 310) and map data 720 (e.g., map data from the map database 410 describing the current environment of the AV 110) are provided to the target object processing module 460. The target object processing module 460 analyzes the images and the map data to determine 730 if a potential location for a target object (e.g., a sign) is available in the environment.

For example, the target object processing module 460 determines is a sufficiently large surface is presently visible. If so, the target object processing module 460 determines 740 if the location is visible for at least a threshold amount of time, based on the camera images 710. For example, the target object processing module 460 reviews images captured over a period of at least 10 seconds to determine if the location remains visible continually for 10 seconds. If so, the target object processing module 460 reports 750 the location of the target object to the fleet management system 120.

SELECT EXAMPLES

Example 1 provides a system for assessing visibility of a target object, the system including a plurality of AVs. Each AV includes a camera and a memory configured to store an image of a target object and an expected location of the target object. Each AV further includes a processor configured to compare a current location of the AV to the expected location of the target object to determine that the AV is traveling past the expected location; in response to determining that the AV is traveling past the expected location, retrieving an image, captured by the camera, of a field of view including the expected location of the target object; and compare the captured image to the image of the target object to determine a visibility of the target object. Each AV further includes communications circuitry configured to provide, to a remote system, visibility data describing the visibility of the target object and condition data describing at least one condition under which the image of the field of view was captured. The remote system is configured to aggregate the visibility data and the condition data received from the plurality of AVs and, based on the aggregated visibility data, determine at least one condition under which the target object does not meet a threshold visibility level.

Example 2 provides the method according to example 1, where the processor is configured to determine a visibility of the target object by identifying, within the image, boundaries of the target object based on the stored image of the target object, and determining a color contrast between at least a portion of the target object and an area outside the boundaries of the target object, the visibility data including the color contrast.

Example 3 provides the method according to example 1 or 2, where the processor is configured to determine a visibility of the target object by identifying, within the image, at least one boundary of the target object based on the stored image of the target object, and determining an obstruction level of the target object, the obstruction level describing an amount of the target object that is obstructed from the AV camera by an obstructing object, the visibility data including the obstruction level.

Example 4 provides the method according to example 3, where each of the plurality of AVs further comprises a lidar sensor configured to capture a point cloud describing at least the target object and the obstructing object, and the processor is further configured to classify the obstructing object as an object type of a plurality of object types based on the captured point cloud.

Example 5 provides the method according to example 4, where the processor is further configured to determine a first distance between the AV and the target object based on the captured point cloud, determine a second distance between the AV and the obstructing object based on the captured point cloud, and determine, based on the first distance and the second distance, an obstruction level of the target object from a viewpoint of a passenger of the AV.

Example 6 provides the method according to any of the preceding examples, where each of the plurality of AVs further comprises an ambient light sensor, and the condition data comprises an ambient light level measured by the ambient light sensor.

Example 7 provides the method according to any of the preceding examples, where the processor is further configured to retrieve a series of images captured by the camera over time as the AV travels past the expected location, and determine, based on the series of images, a duration of time during which the target object is visible to the AV.

Example 8 provides the method according to any of the preceding examples, where the memory includes an image database storing images of a plurality of objects including the target object and a location database storing a plurality of expected object locations of the plurality of objects including the expected location of the target object; and the processor is further configured to compare the current location of the AV to the plurality of expected object locations to determine that the AV is traveling past the expected location.

Example 9 provides a fleet management system including a vehicle manager configured to instruct each of a plurality of AVs of an AV fleet to autonomously drive past a location of a target object, each of the plurality of AVs including a mounted camera, and instructing each of the plurality of AVs to capture, with the camera, an image of a field of view including the location of the target object, and provide visibility data describing visibility of the target object in the image captured by the camera to the fleet management system; a database configured to store, for each of the plurality of AVs, the visibility data provided by the AV and associated condition data describing at least one condition under which each of the plurality of AVs captured its respective image; and a visibility engine configured to determine, based on the stored visibility data and associated condition data, at least one condition under which the target object does not meet a threshold level of visibility.

Example 10 provides the system according to example 9, where the vehicle manager is configured to, for each of the plurality of AVs, instruct the AV to drive along a route between an origin location and a destination location to complete a service request, and determine that a roadway included in the route passes the location of the target object.

Example 11 provides the system according to example 9 or 10, where the visibility data includes at least one of a color contrast describing a contrast between at least a portion of the target object and an area outside a boundary of the target object, an obstruction level describing an amount of the target object that is obstructed from the camera of the AV by an obstructing object, and a visibility duration describing a duration of time during which the target object is visible to the camera of the AV.

Example 12 provides the system according to any of examples 9 through 11, where the condition data includes a date at which the AV captured the image, a time at which the AV captured the image, and data describing at least one weather condition under which the camera captured the image.

Example 13 provides the system according to any of examples 9 through 12, where the fleet management system is configured to receive, from the plurality of AVs, data describing traffic flow conditions under which the camera captured the image, and the condition data comprises the data describing the traffic flow conditions.

Example 14 provides the system according to any of examples 9 through 13, where the visibility engine is further configured to retrieve, from the database, location data describing, for each AV of the plurality of AVs, a location from which the AV captured the image of the location of the target object; and determine a geographic area from which the target object is visible based on the location data and the visibility data.

Example 15 provides the system according to any of examples 9 through 14, where the fleet management system is configured to provide, to each of the plurality of AVs, an expected image of the target object, and each of the plurality of AVs is configured to determine the visibility data describing visibility of the target object in the image captured by the camera by comparing the image captured by the camera to the expected image of the target object.

Example 16 provides the system according to any of examples 9 through 15, where the database is further configured to store data describing, for at least a portion of the plurality of AVs, demographic data describing a passenger of the AV, and the visibility engine is configured to determine, based on the stored visibility data and demographic data, a frequency with which a demographic group views the target object.

Example 17 provides a method for assessing visibility of a target object, the method including instructing each of a plurality of AVs of an AV fleet to autonomously drive past a location of a target object, each of the plurality of AVs including a mounted camera; instructing each of the plurality of AVs to capture, with the camera, at least one image of a field of view including the location of the target object; receiving, from each of the plurality of AVs, data describing visibility of the target object in the at least one imaged captured by the camera; aggregating visibility data describing, for each of the plurality of AVs, visibility of the target object to the camera, and associated condition data describing, for each of the plurality of AVs, at least one condition under which the AV drove past the target object; and determining, based on the aggregated visibility data and condition data, at least one condition under which the target object does not meet a threshold visibility level.

Example 18 provides the method according to example 17, where instructing each of the plurality of AVs to autonomously drive past the location of the target object includes instructing the AV to drive along a route between an origin location and a destination location to complete a service request, and determining that a roadway included in the route passes the location of the target object.

Example 19 provides the method according to example 17 or 18, where the visibility data includes at least one of a color contrast describing a contrast between at least a portion of the target object and an area outside a boundary of the target object, an obstruction level describing an amount of the target object that is obstructed from the camera of the AV by an obstructing object, and a visibility duration describing a duration of time during which the target object is visible to the camera of the AV.

Example 20 provides the method according to any of examples 17 through 19, where the method further includes receiving, from each of the plurality of AVs, location data describing a location from which the AV captured the image of field of view comprising the location of the target object; and determining, based on the location data and the visibility data, a geographic area from which the target object is visible.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A system for assessing visibility of a target object, the system comprising:
    a plurality of autonomous vehicles (AVs), each AV comprising:
        a camera;
        a memory configured to store an image of a target object and an expected location of the target object;
        a processor configured to:
            compare a current location of the AV to the expected location of the target object to determine that the AV is traveling past the expected location,
            in response to determining that the AV is traveling past the expected location, retrieving an image, captured by the camera, of a field of view comprising the expected location of the target object, and
            compare the captured image to the image of the target object to determine a visibility of the target object; and
        communications circuitry configured to provide, to a remote system, visibility data describing the visibility of the target object and condition data describing at least one condition under which the image of the field of view was captured;
    wherein the remote system is configured to aggregate the visibility data and the condition data received from the plurality of AVs and, based on the aggregated visibility data, determine at least one condition under which the target object does not meet a threshold visibility level.

2. The system of claim 1, wherein the processor is configured to determine a visibility of the target object by:
    identifying, within the image, boundaries of the target object based on the stored image of the target object; and
    determining a color contrast between at least a portion of the target object and an area outside the boundaries of the target object, the visibility data comprising the color contrast.

3. The system of claim 1, wherein the processor is configured to determine a visibility of the target object by:
    identifying, within the image, at least one boundary of the target object based on the stored image of the target object; and
    determining an obstruction level of the target object, the obstruction level describing an amount of the target object that is obstructed from the camera by an obstructing object, the visibility data comprising the obstruction level.

4. The system of claim 3, wherein each of the plurality of AVs further comprises a lidar sensor configured to capture a point cloud describing at least the target object and the obstructing object, wherein the processor is further configured to classify the obstructing object as an object type of a plurality of object types based on the captured point cloud.

5. The system of claim 4, wherein the processor is further configured to:
determine a first distance between the AV and the target object based on the captured point cloud,
determine a second distance between the AV and the obstructing object based on the captured point cloud, and
determine, based on the first distance and the second distance, an obstruction level of the target object from a viewpoint of a passenger of the AV.

6. The system of claim 1, wherein each of the plurality of AVs further comprises an ambient light sensor, and the condition data comprises an ambient light level measured by the ambient light sensor.

7. The system of claim 1, wherein the processor is further configured to:
retrieve a series of images captured by the camera over time as the AV travels past the expected location, and
determine, based on the series of images, a duration of time during which the target object is visible to the AV.

8. The system of claim 1, wherein the memory comprises:
an image database storing images of a plurality of objects including the target object, and
a location database storing a plurality of expected object locations of the plurality of objects including the expected location of the target object;
and the processor is further configured to compare the current location of the AV to the plurality of expected object locations to determine that the AV is traveling past the expected location.

9. A fleet management system comprising:
a vehicle manager configured to:
instruct each of a plurality of autonomous vehicles (AVs) of an AV fleet to autonomously drive past a location of a target object, each of the plurality of AVs comprising a mounted camera, and
instruct each of the plurality of AVs to capture, with the camera, an image of a field of view comprising the location of the target object, and provide visibility data describing visibility of the target object in the image captured by the camera to the fleet management system;
a database configured to store, for each of the plurality of AVs, the visibility data provided by the AV and associated condition data describing at least one condition under which each of the plurality of AVs captured its respective image; and
a visibility engine configured to determine, based on the stored visibility data and associated condition data, at least one condition under which the target object does not meet a threshold level of visibility.

10. The system of claim 9, wherein the vehicle manager is configured to, for each of the plurality of AVs:
instruct the AV to drive along a route between an origin location and a destination location to complete a service request, and
determine that a roadway included in the route passes the location of the target object.

11. The system of claim 9, wherein the visibility data comprises at least one of a color contrast describing a contrast between at least a portion of the target object and an area outside a boundary of the target object, an obstruction level describing an amount of the target object that is obstructed from the camera of the AV by an obstructing object, and a visibility duration describing a duration of time during which the target object is visible to the camera of the AV.

12. The system of claim 9, wherein the condition data comprises a date at which the AV captured the image, a time at which the AV captured the image, and data describing at least one weather condition under which the camera captured the image.

13. The system of claim 9, wherein the fleet management system is configured to receive, from the plurality of AVs, data describing traffic flow conditions under which the camera captured the image, and the condition data comprises the data describing the traffic flow conditions.

14. The system of claim 9, wherein the visibility engine is further configured to:
retrieve, from the database, location data describing, for each AV of the plurality of AVs, a location from which the AV captured the image of the location of the target object; and
determine a geographic area from which the target object is visible based on the location data and the visibility data.

15. The system of claim 9, wherein the fleet management system is configured to provide, to each of the plurality of AVs, an expected image of the target object, wherein each of the plurality of AVs is configured to determine the visibility data describing visibility of the target object in the image captured by the camera by comparing the image captured by the camera to the expected image of the target object.

16. The system of claim 9, wherein the database is further configured to store data describing, for at least a portion of the plurality of AVs, demographic data describing a passenger of the AV, and the visibility engine is configured to determine, based on the stored visibility data and demographic data, a frequency with which a demographic group views the target object.

17. A method for assessing visibility of a target object, the method comprising:
instructing each of a plurality of autonomous vehicles (AVs) of an AV fleet to autonomously drive past a location of a target object, each of the plurality of AVs comprising a mounted camera;
instructing each of the plurality of AVs to capture, with the camera, at least one image of a field of view comprising the location of the target object;
receiving, from each of the plurality of AVs, data describing visibility of the target object in the at least one imaged captured by the camera;
aggregating visibility data describing, for each of the plurality of AVs, visibility of the target object to the camera, and associated condition data describing, for each of the plurality of AVs, at least one condition under which the AV drove past the target object; and
determining, based on the aggregated visibility data and condition data, at least one condition under which the target object does not meet a threshold visibility level.

18. The method of claim 17, wherein instructing each of the plurality of AVs to autonomously drive past the location of the target object comprises:

instructing the AV to drive along a route between an origin location and a destination location to complete a service request, and determining that a roadway included in the route passes the location of the target object.

19. The method of claim 17, wherein the visibility data comprises at least one of a color contrast describing a contrast between at least a portion of the target object and an area outside a boundary of the target object, an obstruction level describing an amount of the target object that is obstructed from the camera of the AV by an obstructing object, and a visibility duration describing a duration of time during which the target object is visible to the camera of the AV.

20. The method of claim 17, further comprising:

receiving, from each of the plurality of AVs, location data describing a location from which the AV captured the image of the field of view comprising the location of the target object; and determining, based on the location data and the visibility data, a geographic area from which the target object is visible.

* * * * *